US008532168B2

(12) United States Patent
Lin et al.

(10) Patent No.: US 8,532,168 B2
(45) Date of Patent: Sep. 10, 2013

(54) RECEIVER AND METHOD FOR ADJUSTING ADAPTIVE EQUALIZER OF RECEIVER

(75) Inventors: Po Nien Lin, Hsinchu Hsien (TW); Sterling Smith, Hsinchu Hsien (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 533 days.

(21) Appl. No.: 12/769,905

(22) Filed: Apr. 29, 2010

(65) Prior Publication Data

US 2011/0032978 A1 Feb. 10, 2011

(30) Foreign Application Priority Data

Aug. 5, 2009 (TW) .............................. 98126372 A

(51) Int. Cl.
*H03H 7/30* (2006.01)
*H03H 7/40* (2006.01)
*H03K 5/159* (2006.01)

(52) U.S. Cl.
USPC ........... 375/232; 375/229; 375/230; 382/270; 455/240.1

(58) Field of Classification Search
USPC .......................................... 375/229, 230, 232
See application file for complete search history.

(56) References Cited

U.S. PATENT DOCUMENTS

| 5,835,155 A * | 11/1998 | Jennes et al. ................... 348/536 |
| 6,744,330 B1 * | 6/2004 | Jones et al. ................... 333/28 R |
| 7,415,083 B2 * | 8/2008 | Anderson ...................... 375/345 |
| 7,787,564 B1 * | 8/2010 | Anvari ........................... 375/297 |
| 2004/0070581 A1 * | 4/2004 | Hiraki et al. ................... 345/209 |
| 2006/0209884 A1 * | 9/2006 | MacMullan et al. .......... 370/465 |
| 2007/0047737 A1 * | 3/2007 | Lerner et al. .................... 381/22 |
| 2007/0183553 A1 * | 8/2007 | Sanders et al. ................. 375/376 |
| 2008/0305760 A1 * | 12/2008 | Meltzer et al. ................. 455/334 |
| 2009/0135304 A1 * | 5/2009 | Inoue et al. .................... 348/712 |
| 2010/0246657 A1 * | 9/2010 | Ou ................................. 375/232 |

* cited by examiner

*Primary Examiner* — Kenneth Lam
*Assistant Examiner* — Sung Ahn
(74) *Attorney, Agent, or Firm* — WPAT, PC; Justin King

(57) ABSTRACT

A receiver includes an adaptive equalizer, a power detecting unit and an adjusting unit. The adaptive equalizer is for receiving a signal and generating an equalized signal. The power detecting unit, coupled to the adaptive equalizer, is for detecting the strength of the equalized signal during a first period to generate a first strength signal, and detecting the strength of the equalized signal during a second period to generate a second strength signal. The adjusting unit, coupled to the power detecting unit and the adaptive equalizer, is for adjusting the compensation strength for the adaptive equalizer according to the first and second strength signals.

14 Claims, 11 Drawing Sheets

RECEIVER AND METHOD FOR ADJUSTING ADAPTIVE EQUALIZER OF RECEIVER

CROSS REFERENCE TO RELATED PATENT APPLICATION

This patent application is based on a Taiwan, R.O.C. patent application No. 098126372 filed on Aug. 5, 2009.

FIELD OF THE INVENTION

The present invention relates to a receiver, and more particularly, to a receiver capable of automatically adjusting an adaptive equalizer, and a method for adjusting the compensation strength for the adaptive equalizer of the receiver.

BACKGROUND OF THE INVENTION

FIG. 1 shows a conventional serial-link data transceiving module 100. As shown in FIG. 1, the data transceiving module 100 comprises a transmitter 110, and transmission channel 120, and a receiver 130 that comprises an equalizer 132. To operate the data transceiving module 100, the transmitter 110 first receives and processes a signal $V_{in}$, and transmits the processed signal through the transmission channel 120 to the receiver 130. The receiver 130 then processes the received signal to generate an output signal $V_{out}$. However, since the transmission channel 120 is substantially similar to a low-pass filter, the amplitude of high-frequency components of the signal is attenuated when the signal passes through the transmission channel 120 as shown in FIG. 2, to result in inter-symbol interference (ISI) as well as jitter.

To solve the issue of attenuation of the high-frequency components of the signal passed through the transmission channel 120, the conventional receiver 130 compensates the loss of the high-frequency components of the received signal by implementing the equalizer 132. FIG. 3 shows a schematic diagram of frequency resonances of the equalizer 132. As shown, curves 301, 302, 303, 304 and 305 are programmable frequency resonances of the equalizer 132. The curve 301 represents a maximum strength of the equalizer 132, i.e., the curve 301 represents a maximum compensation that the equalizer 132 provides to the high-frequency components of a received signal; the curve 305 represents a minimum strength of the equalizer 132, i.e., the curve 305 represents a least compensation that the equalizer 132 provides to the high-frequency components of a received signal. In general, the strengths of the equalizer 132 are selected in advance; that is to say, a designer first estimates the amount of attenuation that the transmission channel 120 reflects on the high-frequency components of a received signal to determine the fixed strength of the equalizer 132. However, the attenuation that the transmission channel 120 reflects on the high-frequency components of a received signal, instead of being ideally constant, changes along with the type or length of the transmission channel 120. As a result, the equalizer 132 in a conventional receiver 130 fails to provide the high-frequency components of a received signal with a most appropriate compensation such that issues of ISI and jitter still remain.

SUMMARY OF THE INVENTION

Therefore, an objective of the invention is to provide a receiver capable of automatically adjusting an adaptive equalizer and a method for adjusting the compensation strength for the adaptive equalizer of the receiver, so as to overcome the disadvantages associated with the conventional receiver.

According to an embodiment of the invention, a receiver comprises an adaptive equalizer, a power detecting unit, and an adjusting unit. The adaptive equalizer is for receiving a signal and outputting an equalized signal. The power detecting unit, coupled to the adaptive equalizer, is for detecting the strength of the equalized signal during a first period to generate a first strength signal, and detecting the strength of the equalized signal during a second period to generate a second strength signal. The adjusting unit, coupled to the power detecting unit and the adaptive equalizer, is for adjusting a compensation strength for the adaptive equalizer according to the first and second strength signals.

According to another embodiment of the invention, a method for adjusting a compensation strength for an adaptive equalizer of a receiver comprises equalizing a signal with the adaptive equalizer to generate an equalized signal; detecting the strength of the equalized signal during a first period to obtain a first strength signal, and detecting the strength of the equalized signal during a second period to obtain a second strength signal; and adjusting the compensation strength for the adaptive equalizer according to the first and second strength signals.

With the receiver and the method for adjusting the compensation strength for the adaptive equalizer of the receiver according to the invention, the adaptive equalizer automatically adjusts to a most appropriate strength so that ISI and jitter in the equalized signal are minimized.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 4:
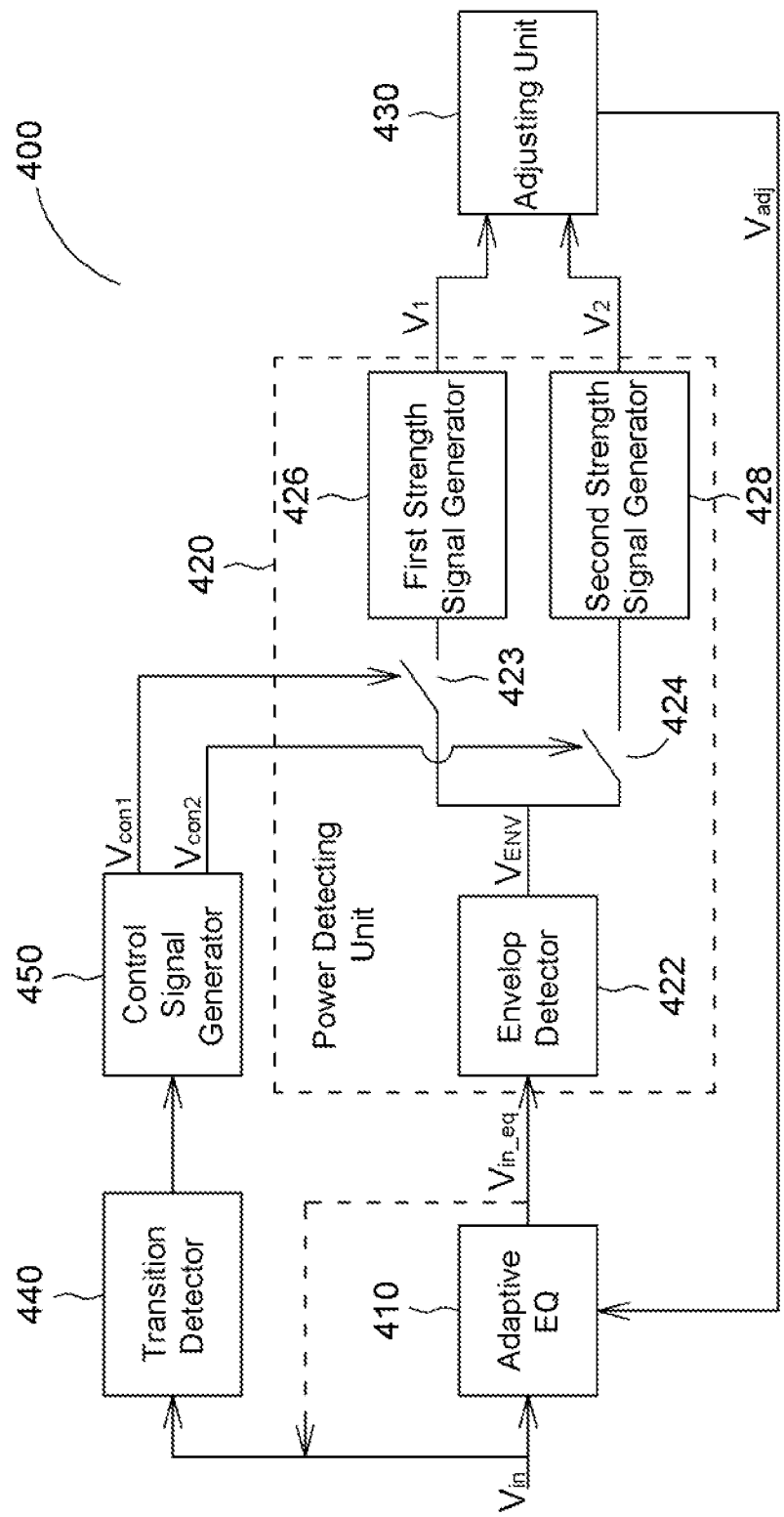
FIG. 4 is a schematic diagram of a receiver according to one embodiment of the invention.

FIG. 4 shows a schematic diagram of a receiver 400 according to one embodiment of the invention. The receiver 400 comprises an adaptive equalizer 410, a power detecting unit 420, an adjusting unit 430, a transition detector 440, and a control signal generator 450. The power detecting unit 420 comprises an envelope detector 422, two switches 423 and 424, a first strength signal generator 426, and a second strength signal generator 428. Further, the receiver 400 is a serial-link receiver compliant with any standard protocol, such as the High-Definition Multimedia Interface (HDMI) specifications or the Digital Visual Interface (DVI) specifications.

Figure 5:
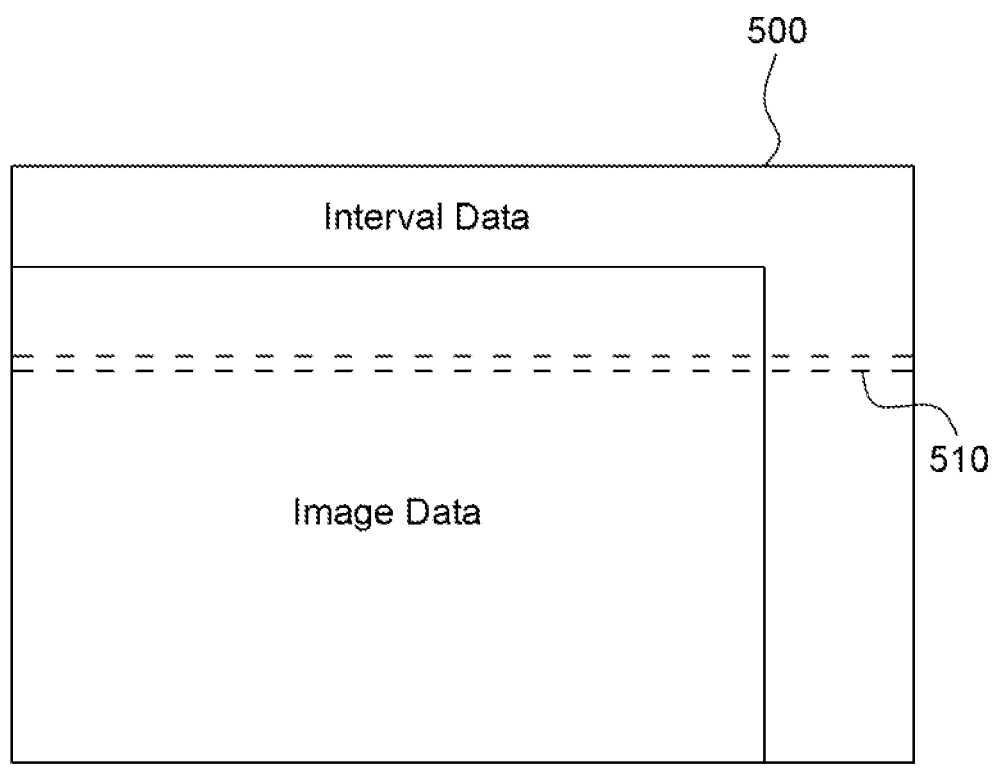
FIG. 5 is a schematic diagram of an HDMI format.
Figure 6:
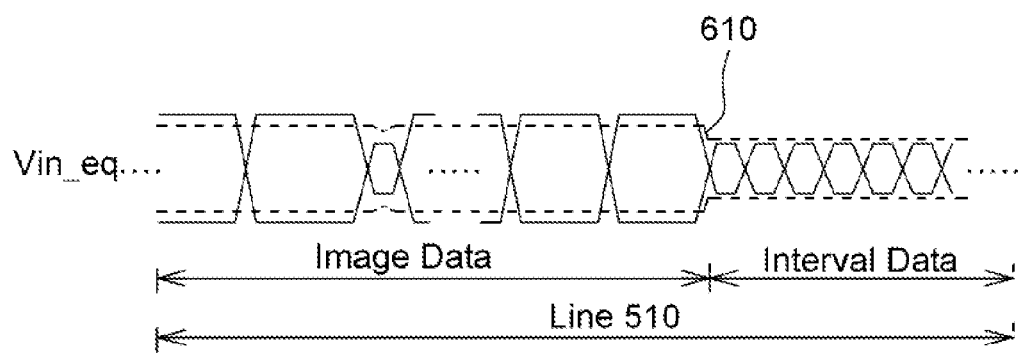
FIG. 6 is a schematic diagram of strengths of image data and interval data in a video signal passed through a transmission channel.

To operate the receiver 400, the adaptive equalizer 410 first receives and processes a video signal $V_{in}$, which can be an HDMI-compliant or a DVI-compliant signal, to generate an equalized video signal $V_{in\_eq}$. Referring to FIG. 5 showing a schematic diagram of an HDMI format, a frame 500 comprises image data and interval data. The image data corresponds to data of visible areas on a display and includes data of pixels; the interval data corresponds to invisible areas on the display and are control codes. In the HDMI format, the image data is encoded by transition minimized differential signaling (TMDS), which is characterized in having fewer transitions that are accounted for more low-frequency components in the signal. Therefore, with reference to FIG. 6 showing a timing diagram of the equalized video signal $V_{in\_eq}$ that is transmitted line-by-line according to the frame 500, taking a line 510 as an example, the image data has a lower transition density and more low-frequency components, and the interval data that is not TMDS-encoded has a higher transition density and more high-frequency components. Further, due to channel attenuation and the lack of compensation by an equalizer, the image data in average has larger amplitude (strength) and the interval data in average has smaller amplitude (strength).

Figure 7:
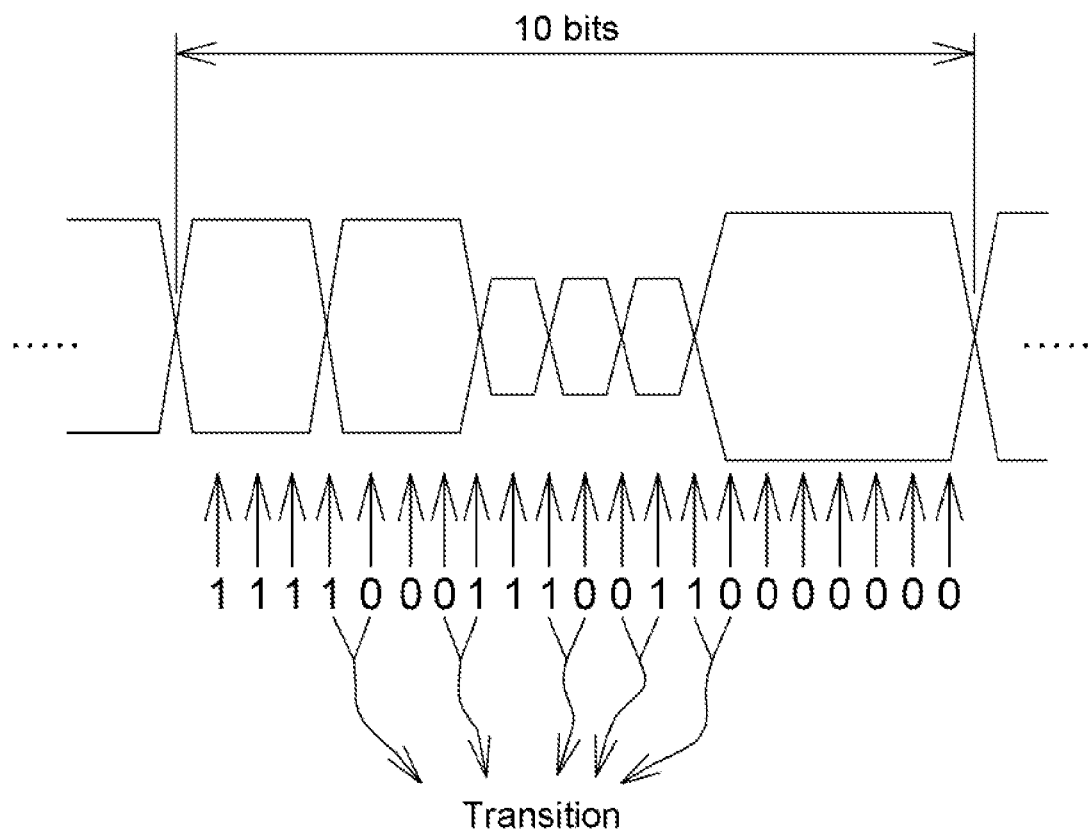
FIG. 7 is a schematic diagram of a method for determining the transition density.

The envelope detector 422, upon detecting the equalized video data $V_{in\_eq}$, generates an envelope signal $V_{env}$. The envelope signal $V_{env}$ is regarded as the strength of the envelope lines of the equalized video signal $V_{in\_eq}$, and is approximately as shown by envelope lines 610 in FIG. 6. Meanwhile, the transition detector 440 detects the transition density of the video signal $V_{in}$ and informs the control signal generator 450 of the number detected. For example, the transition density is defined as the number of transitions (i.e., switching between a high level and a low level) of the video signal $V_{in}$ within a constant period, e.g., within a period for transmitting 10 bits of data. FIG. 7 shows a schematic diagram of a method for determining the transition density. As shown in FIG. 7, the transition detector 440 samples the equalized video signal $V_{in\_eq}$ to generate sampling signals (i.e., 111100011 . . . in FIG. 7), and determines according to the sampling signals the transition density there are within the period of 10 bits. In the example shown in FIG. 7, 5 transitions are present within the period of 10 bits.

In the schematic diagram of the receiver 400 depicted in FIG. 4, the transition detector 440 detects the transition density of the video signal $V_{in}$; however, in other embodiments of the invention, the transition detector 440 may also detect the equalized video signal $Y_{in\_eq}$ or other signals substantially the same as the video signal $V_{in}$ to obtain the number of transition, as such design modifications are also encompassed within the scope of the invention.

When the transition density of the video signal $V_{in}$ (or the equalized video signal $V_{in\_eq}$) is lower than a first threshold, it means that the video signal $V_{in}$ (or the equalized video signal $V_{in\_eq}$) is transmitting image data having more low-frequency components. At this point, the control signal generator 450 closes the switch 423 (while the switch 424 is open) with a first control signal $V_{con1}$, so that the first strength signal generator 426 receives the envelope signal $V_{env}$ to generate a first strength signal $V_1$, which represents a value of the envelope signal $V_{env}$, i.e., the signal amplitude of the equalized video signal $Y_{in\_eq}$ when transmitting image data. When the transition density of the video signal $V_{in}$ (or the equalized video signal $V_{in\_eq}$) is higher than a second threshold, it means that the video signal $V_{in}$ (or the equalized video signal $V_{in\_eq}$) is transmitting interval data having more high-frequency components. At this point, the control signal generator 450 closes the switch 424 (while the switch 423 is open) with a second control signal $V_{con2}$, so that the second strength signal generator 428 receives the envelope signal $V_{env}$ to generate a second strength signal $V_2$, which represents a value of the envelope signal $V_{env}$, i.e., the signal amplitude of the equalized video signal $Y_{in\_eq}$ when transmitting interval data.

For example, in one embodiment of the invention, the transition density is defined as the transition density of the video signal $V_{in}$ within a period for transmitting 10 bits of data, the first threshold is defined as having 5 transitions in 10 consecutive bits; and the second threshold is defined as having 7 transitions in 10 consecutive bits. More specifically, supposing the transition density of the video signal $V_{in}$ detected in 10 consecutive bits is N, the video data $V_{in}$ is currently transmitting image data when N<5, or interval data when N>7.

Figure 8:
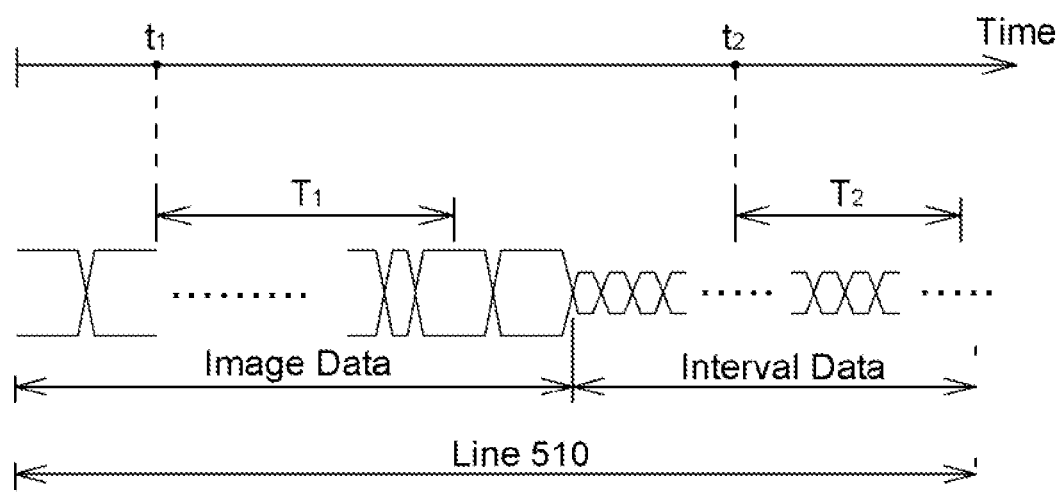
FIG. 8 is a schematic diagram depicting a power detecting unit detecting the strength of an equalized signal at a first period and detecting the strength of an equalized signal at a second period.

When the first strength signal generator 426 is selected to receive the envelope signal $V_{env}$ and to generate the first strength signal $V_1$, the first strength signal generator 426 continuously receives the envelope signal $V_{env}$ during a period or multiple periods with intervals in between, and digitally calculates an average of the envelope signal $V_{env}$ or performs analog filtering to generate a moving average of the envelope signal $V_{env}$ to serve as the first strength signal $V_1$. Referring to FIG. 8, supposing at a time point $t_1$, it is determined that the transition density is lower than a first threshold, i.e., the video signal $V_{in}$ is transmitting image data, the control signal generator 450 closes the switch 423 with the first control signal $V_{con1}$. During a period $T_1$ when the switch 423 is closed, the first strength signal generator 426 continuously receives the envelope signal $V_{env}$, and averages the received envelope signal $V_{env}$ to generate the first strength signal $V_1$. It is to be noted that, in the foregoing embodiment, the first strength signal generator 426 receives the envelope signal $V_{env}$ during the period $T_1$ to accordingly generate the first strength signal $V_1$; however, in other embodiment of the invention, the first strength signal generator 426 may receive a plurality of rows of envelope signals $V_{env}$ corresponding to the video signal $V_{in}$ e.g., 8 adjacent rows of envelope signals $V_{env}$, one of which is similar to 510 in FIG. 5. That is, the first strength signal generator 426 receives the envelope signal $V_{env}$ during a plurality of discontinuous periods (i.e., periods with intervals in between) that correspond to different image data, and averages the received envelope signal $V_{env}$ to generate the first strength signal $V_1$. Modifications as such and other modifications by those skilled in the art shall also be encompassed within the scope of the invention.

Similarly, in the operations of the second strength signal generator 428, it receives the envelope signal $V_{env}$ to generate the second strength signal $V_2$; the second strength signal generator 428 continuously receives the envelope signal $V_{env}$ during a period or multiple periods with intervals in between, and digitally calculates an average of the envelope signal $V_{env}$ or performs analog filtering to generate a moving average of the envelope signal $V_{env}$ to serve as the second strength signal $V_2$. Referring to FIG. 8, supposing at a time point $t_2$, it is determined that the transition density is higher than a second threshold, i.e., the video signal $V_{in}$ is transmitting interval data, the control signal generator 450 closes the switch 424 with the second control signal $V_{con2}$. During a period $T_2$ when the switch 424 is closed, the second strength signal generator 428 continuously receives the envelope signal $V_{env}$, and averages the received envelope signal $V_{env}$ to generate the second strength signal $V_2$. It is to be noted that, in the foregoing embodiment, the second strength signal generator 428 receives the envelope signal $V_{env}$ during the period $T_2$ to accordingly generate the second strength signal $V_2$; however, in other embodiment of the invention, the second strength signal generator 428 may receive a plurality of rows of envelope signals $V_{env}$ corresponding to the video signal $V_{in}$, e.g., 2 adjacent rows of envelope signals $V_{env}$, one of which is similar to 510 in FIG. 5. That is, the second strength signal generator 428 receives the envelope signal $V_{env}$ during a plurality of discontinuous periods (i.e., periods with intervals in between) that correspond to different interval data, and averages the received envelope signal $V_{env}$ to generate the second strength signal $V_2$. Modifications as such and other modifications by those skilled in the art shall also be encompassed within the scope of the invention.

Further, the internal elements of the power detecting unit 420 are illustrated as an example, and provided that the power detecting unit 420 is capable of detecting the strength of the image data and interval data of the equalized video signal $V_{in\_eq}$ to serve as the first strength signal $V_1$ and the second strength signal $V_2$, various modifications to the power detecting unit 420 in other embodiments may be made.

After obtaining the first strength signal $V_1$ and the second strength signal $V_2$, the adjusting unit 430 generates an adjusting signal $V_{adj}$ according to the first strength signal $V_1$ and the second strength signal $V_2$, and adjusts the compensation strength for the adaptive equalizer 410 according to the adjusting signal $V_{adj}$.

Figure 1:
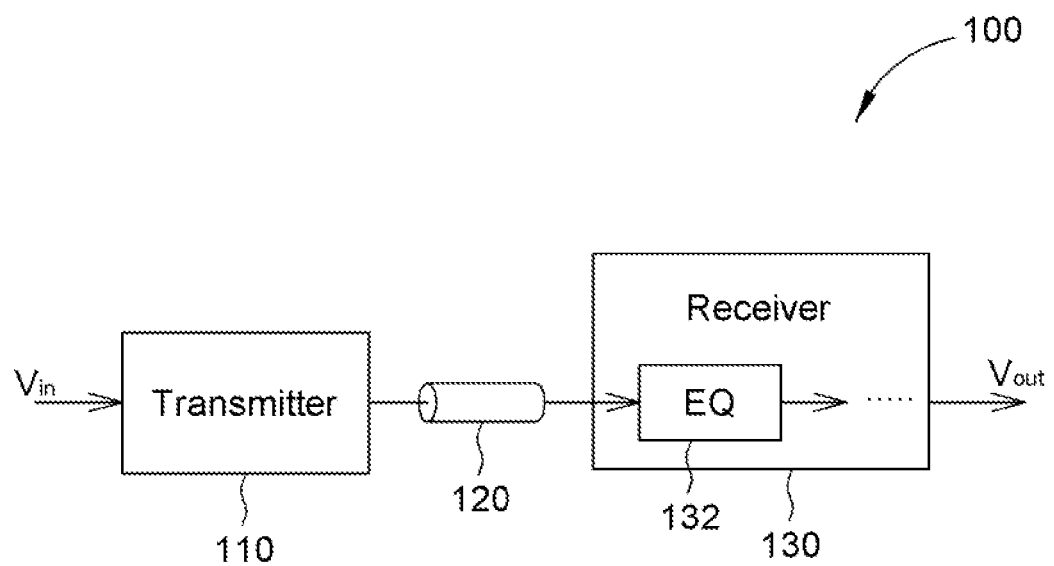
FIG. 1 is a schematic diagram of a conventional serial-link data transceiving module.
Figure 2:
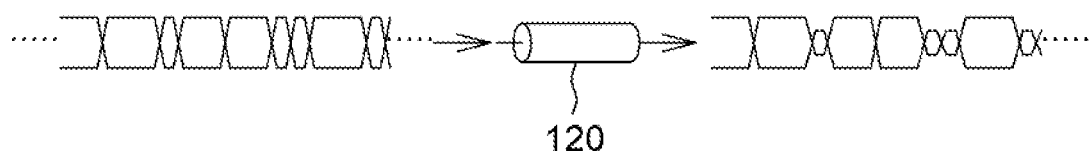
FIG. 2 is a schematic diagram illustrating amplitude (strength) attenuation in high-frequency components when a signal passes through a transmission channel.
Figure 3:
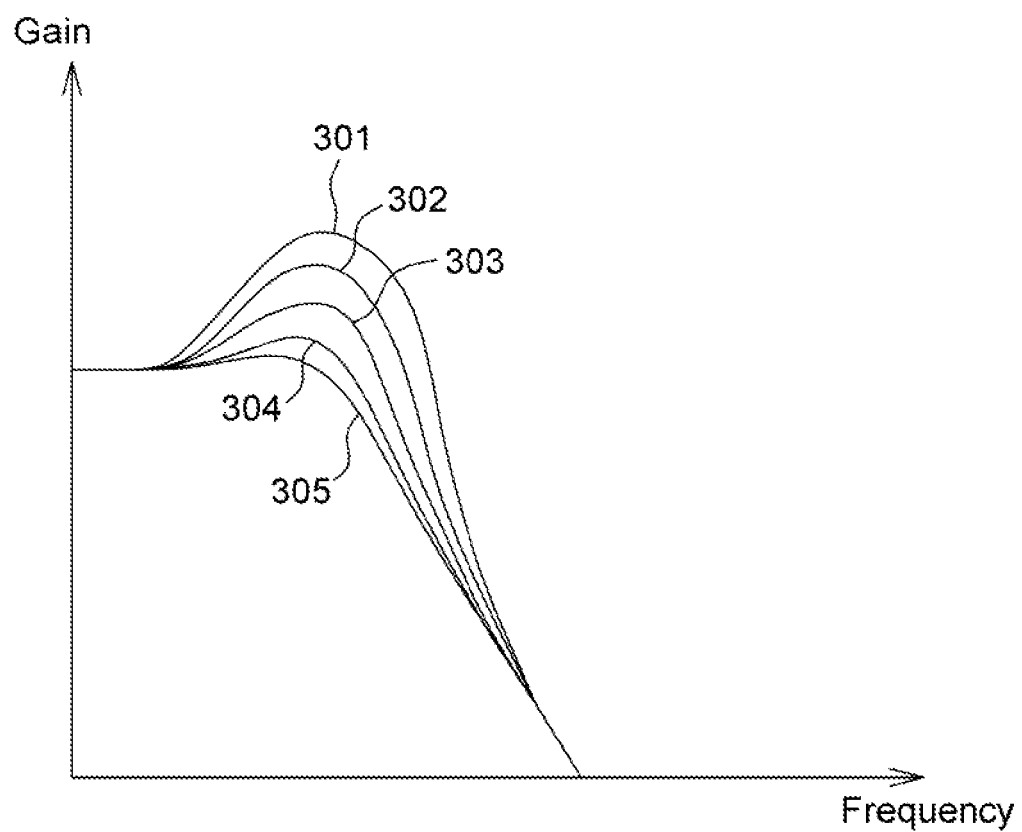
FIG. 3 is a schematic diagram of a plurality of frequency resonances of an equalizer.

According to one embodiment of the invention, the adjusting unit 430 compares the first strength signal $V_1$ and the second strength signal $V_2$ to determine whether to adjust (i.e., increase or decrease) the compensation strength for the adaptive equalizer 410. The comparison criteria may be a difference or a ratio between the first strength signal $V_1$ and the second strength signal $V_2$. For example, when the first strength signal $V_1$ is larger than the second strength signal $V_2$, it means that the amplitude (strength) of the image data in the equalized video signal $V_{in\_eq}$ is greater than the amplitude (strength) of the interval data, which implies that the adaptive equalizer 410 under-compensates the high-frequency components of the video signal $V_{in}$. Therefore, the adjusting unit 430 adjusts the compensation strength for the adaptive equalizer 410 using the adjusting signal $V_{adj}$, e.g., increasing the compensation strength for the adaptive equalizer 410 from the curve 303 to the curve 302 in FIG. 3. In contrast, when the first strength signal $V_1$ is smaller than the second strength signal $V_2$, it means that the amplitude (strength) of the image data in the equalized video signal $V_{in\_eq}$ is smaller than the amplitude (strength) of the interval data, which implies that the adaptive equalizer 410 over-compensates the high-frequency components of the video signal $V_{in}$. Therefore, the adjusting unit 430 adjusts the compensation strength for the adaptive equalizer 410 using the adjusting signal $V_{adj}$, e.g., decreasing the compensation strength for the adaptive equalizer 410 from the curve 303 to the curve 304 in FIG. 3.

In order to prevent the adjusting unit 430 from constantly adjusting the compensation strength for the adaptive equalizer 410 that potentially causes discomfort in viewing the image data, according to one embodiment of the invention, when the first strength signal $V_1$ is greater than the second strength signal $V_2$ and a difference between the two exceeds a third threshold, the adjusting unit 430 adjusts the compensation strength for the adaptive equalizer 410; when the first strength signal $V_1$ is greater than the second strength signal $V_2$ and the difference between the two does not exceed the third threshold, the adjusting unit 430 does not adjust the compensation strength for the adaptive equalizer 410; when the first strength signal $V_1$ is smaller than the second strength signal $V_2$ and the difference between the two exceeds a fourth threshold, the adjusting unit 430 adjusts the adaptive equalizer 410; and when the first strength signal $V_1$ is smaller than the second strength signal $V_2$ and the difference between the two does not exceed the fourth threshold, the adjusting unit 430 does not adjust the adaptive equalizer 410. In short, when the difference between the first strength signal $V_1$ and the second strength signal $V_2$ is within a predetermined range, i.e., when the amplitude of the image data and the amplitude of the interval data of the equalized video signal $V_{in\_eq}$ is within a tolerable range, the adjusting unit 430 does not adjust the adaptive equalizer 410 to prevent causing discomfort of a viewer.

Further, in order to prevent the adjusting unit 430 from constantly adjusting the compensation strength for the adaptive equalizer 410 that potentially causes discomfort in viewing the image data, according to one embodiment of the invention, when the first strength signal $V_1$ is greater than the second strength signal $V_2$, the adjusting unit 430 first increases the compensation strength for the adaptive equalizer 410 until the first strength signal $V_1$ gets smaller than the second strength signal $V_2$, and then becomes temporarily suspended; when the first strength signal $V_1$ is smaller than the second strength signal $V_2$, the adjusting unit 430 first decreases the compensation strength for the adaptive equalizer 410 until the first strength signal $V_1$ gets greater than the second strength signal $V_2$, and then becomes temporarily suspended. For example, supposing the current compensation strength for the adaptive equalizer 410 is the curve 304 shown in FIG. 3, and the first strength signal $V_1$ is greater than the second strength signal $V_2$ (i.e., the adaptive equalizer 410 currently under-compensates the loss in the high-frequency components of the signal), the adjusting unit 430 increases the compensation strength for the adaptive equalizer 410 to the curve 303. With the compensation strength for the adaptive equalizer 410 being the curve 303, the adjusting unit 430 determines the difference between the first strength signal $V_1$ and the second strength signal $V_2$. When the first strength signal $V_1$ is still greater than the second strength signal $V_2$, the adjusting unit 430 again increases the compensation strength for the adaptive equalizer 430 to the curve 302. Vice versa, when the first strength signal $V_1$ is smaller than the second strength signal $V_2$, the adjusting unit 430 stops adjusting the compensation strength for the adaptive equalizer 410 by keeping the compensation strength for the adaptive equalizer 410 at the curve 303. Until a next predetermined condition becomes valid, e.g., when a user turns off the receiver 400 and re-powers on the receiver 400, the compensation strength for the adaptive equalizer 410 may then be further adjusted.

Figure 9:
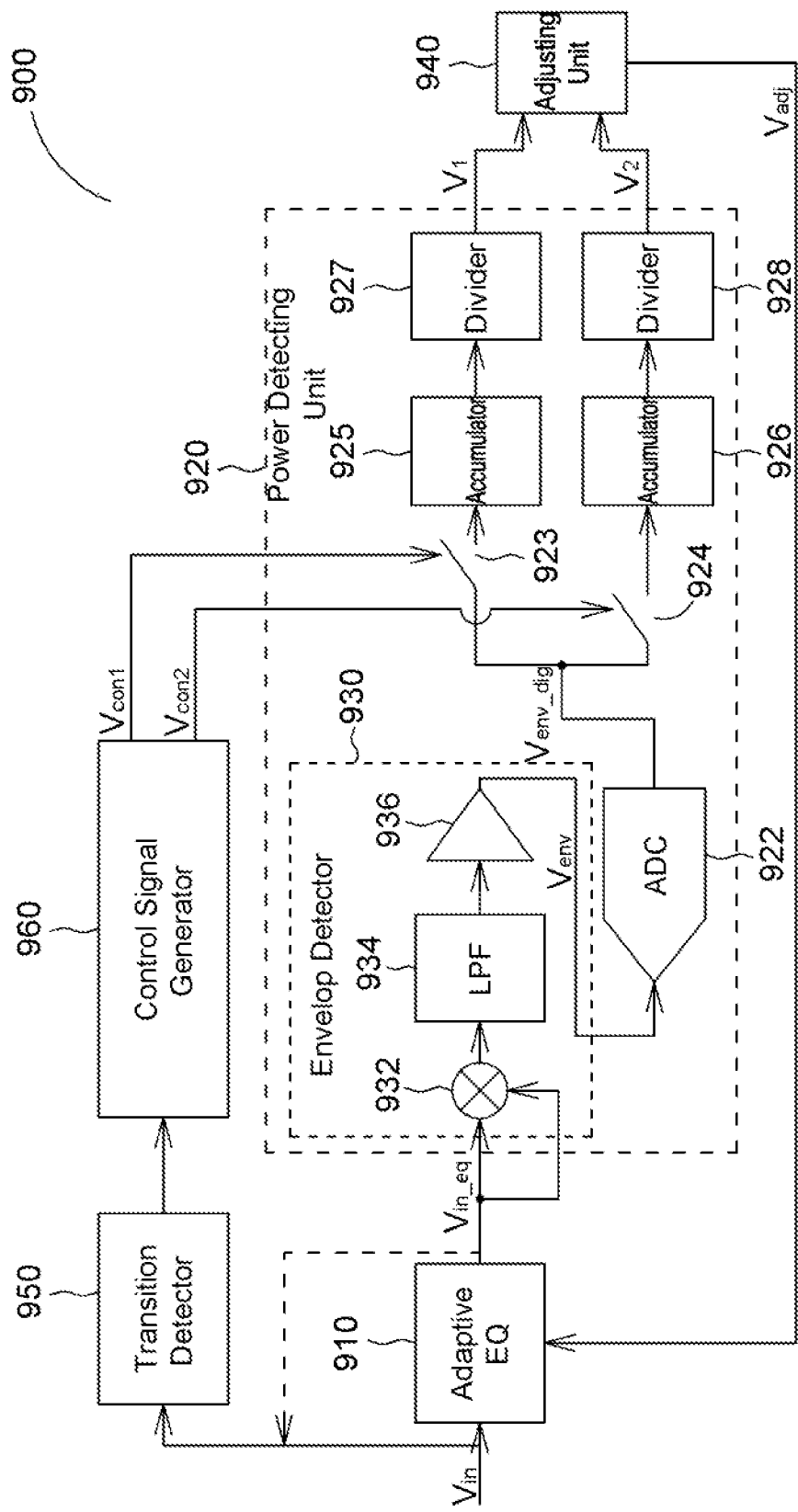
FIG. 9 is a schematic diagram of digital elements for realizing partial elements of the receiver shown in FIG. 4.

FIG. 9 shows a schematic diagram of digital elements for realizing partial elements of the receiver 400 shown in FIG. 4. As shown, a receiver 900 comprises an adaptive equalizer 910, a power detecting unit 920, an adjusting unit 940, a transition detector 950, and a control signal generator 960. The power detecting unit 920 comprises an envelope detector 930, an analog-to-digital converter (ADC) 922, two switches 923 and 924, two adders 925 and 926, two dividers 927 and 928. The envelope detector 930 comprises a voltage multiplier 932, a low-pass filter 934, and an amplifier 936.

Operations of the receiver 900 shall be described below. The adaptive equalizer 910 receives a video signal $V_{in}$ to generate an equalized signal $V_{in\_eq}$. The voltage multiplier 932, the low-pass filter 934, and the amplifier 936 respectively squares, low-pass filters, and amplifies the received signal to generate an envelope signal $V_{env}$. The ADC 922 then converts the envelope signal $V_{env}$ from analog to digital to generate a digital envelope signal $V_{env\_dig}$.

Meanwhile, the transition detector 950 detects the transition density of the video signal $V_{in}$ (or the equalized video signal $V_{in\_eq}$) and informs the control signal generator 960 of the transition density detected. When the transition density of the video signal $V_{in}$ (or the equalized video signal $V_{in\_eq}$) is lower than a first threshold, it means that the video signal $V_{in}$ (or the equalized video signal $V_{in\_eq}$) is transmitting image data having more low-frequency components. At this point, the control signal generator 960 closes the switch 923 (while the switch 924 is open) with a first control signal $V_{con1}$, so that the adder 925 adds up the digital envelope signal $V_{env\_dig}$, and the divider 927 divides an output from the adder 925 to obtain the first strength signal $V_1$. More specifically, the adder 925 and the divider 927 are for calculating an average of the digital envelope signal $V_{env\_dig}$. When the transition density of the video signal $V_{in}$ (or the equalized video signal $V_{in\_eq}$) is higher than a second threshold, it means that the video signal $V_{in}$ (or the equalized video signal $V_{in\_eq}$) is transmitting interval data having more high-frequency components. At this point, the control signal generator 960 closes the switch 924 (while the switch 923 is open) with a second control signal $V_{con2}$, so that the adder 926 adds up the digital envelope signal $V_{env\_dig}$, and the divider 928 divides an output from the adder 926 to obtain the second strength signal $V_2$. More specifically, the adder 926 and the divider 928 are for calculating an average of the digital envelope signal $V_{env\_dig}$.

After obtaining the first strength signal $V_1$ and the second strength signal $V_2$, the adjusting unit 940 generates an adjusting signal $V_{adj}$ according to the first strength signal $V_1$ and the second strength signal $V_2$, and adjusts the compensation strength for the adaptive equalizer 910 according to the adjusting signal $V_{adj}$. It is to be noted that the receiver 900 is an embodiment of digitally realizing the receiver 400 shown in FIG. 4. Modifications thereto and operations of the adjusting unit 940 are similar to the aforementioned description of the receiver 400, and thus related description shall be omitted for brevity.

Figure 10:
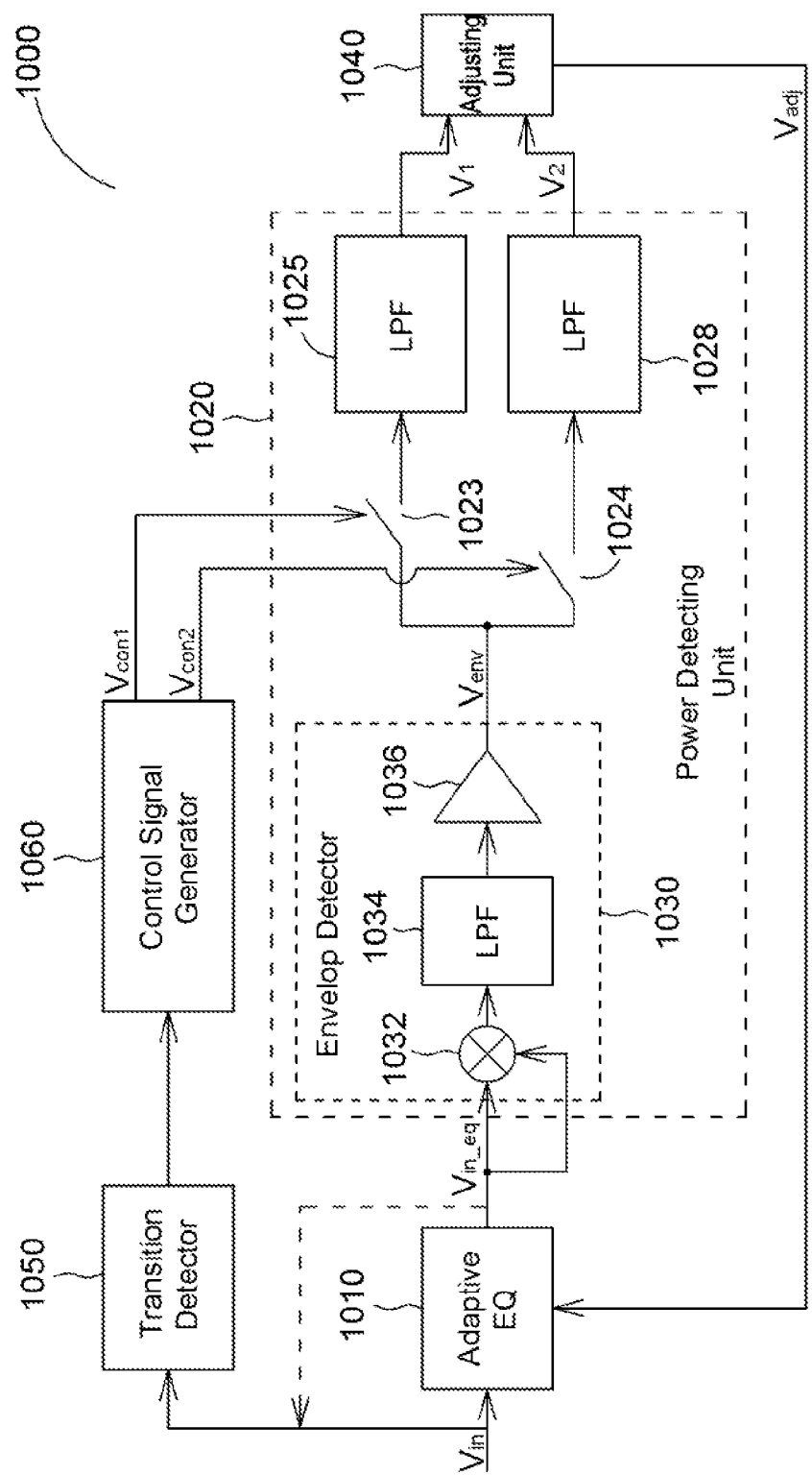
FIG. 10 is a schematic diagram of analog elements for realizing the receiver shown in FIG. 4.

FIG. 10 shows a schematic diagram of analog elements for realizing partial elements of the receiver 400 shown in FIG. 4. A receiver 1000 comprises an adaptive equalizer 1010, a power detecting unit 1020, a adjusting unit 1040, a transition detector 1050, and a control signal generator 1060. The power detecting unit 1020 comprises an envelope detector 1030, two switches 1023 and 1024, and two low-pass filters 1026 and 1028. The envelope detector 1030 comprises a voltage multiplier 1032, a low-pass filter 1034, and an amplifier 1036.

Figure 11:
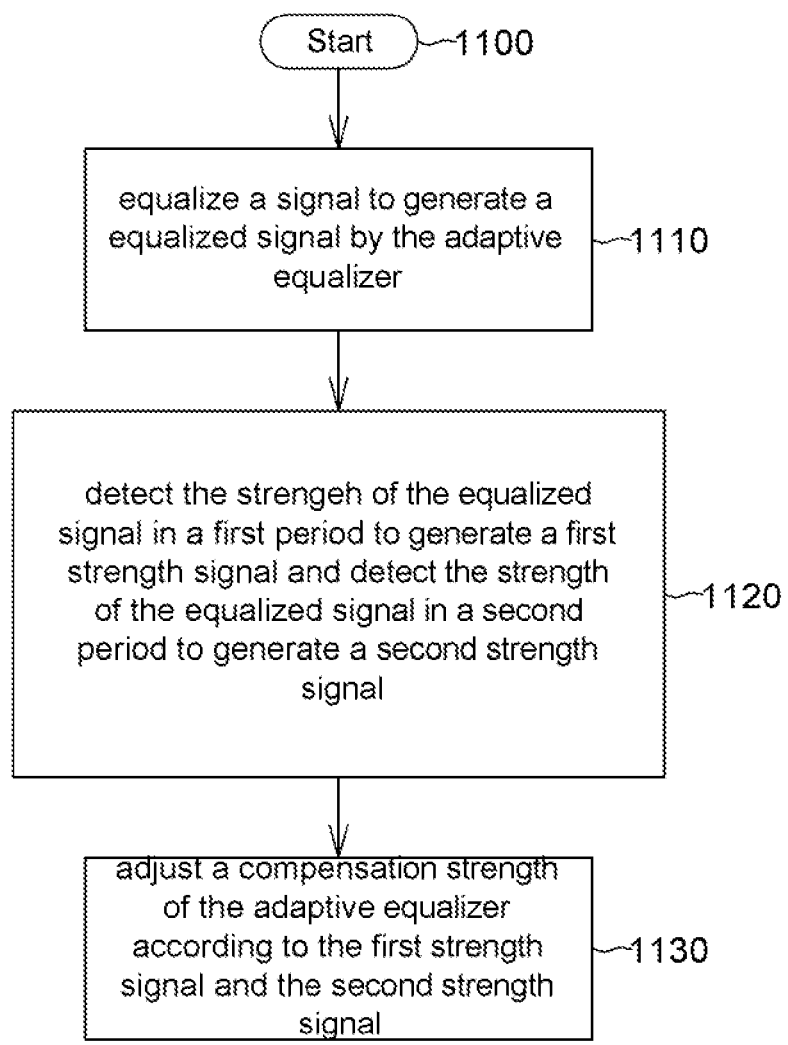
FIG. 11 is a flowchart of a method for adjusting the strength of an adaptive equalizer of a receiver according to one embodiment of the invention.

Referring to FIG. 11 showing a flowchart of a method for adjusting the strength of an adaptive equalizer of a receiver (corresponding to the receiver 400 shown in FIG. 4) according to one embodiment of the invention, the method comprises steps below.

The flow begins with Step 1100. In Step 1110, an equalized signal is generated from equalizing a signal with the adaptive equalizer. In Step 1120, a first strength signal and a second strength signal are obtained respectively by detecting the equalized signal during a first period and a second period. The first and second periods corresponds to separate periods of the equalized signal. In Step 1130, the compensation strength for the adaptive equalizer is adjusted according to the first and second strength signals.

With a receiver and a method for adjusting the strength of an adaptive equalizer of the receiver according to the invention, a first strength signal is obtained by detecting an equalized signal during a first period, a second strength signal is obtained by detecting the equalized signal during a second period, and the compensation strength for the adaptive equalizer is adjusted according to the first and second strength signals. Therefore, the adaptive equalizer is capable of automatically adjusting to a most appropriate strength so that ISI and jitter in the equalized signal are minimized.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A receiver for receiving an input signal from one of HDMI and DVI, comprising:
    an adaptive equalizer, for receiving the input signal and generating an equalized signal;
    a power detecting unit, coupled to the adaptive equalizer, for detecting the equalized signal during a first period to obtain a first strength signal, and detecting the equalized signal during a second period to obtain a second strength signal; and
    an adjusting unit, coupled to the power detecting unit and the adaptive equalizer, for adjusting a compensation strength for the adaptive equalizer according to the first strength signal and second strength signal, wherein the adjusting unit increases the compensation strength for the adaptive equalizer when the first strength signal is greater than the second strength signal, and decreases the compensation strength for the adaptive equalizer when the first strength signal is smaller than the second strength signal;
    wherein the equalized signal is image data during the first period and the equalized signal is interval data during the second period.

2. The receiver as claimed in claim 1, wherein the first period and the second period are separated periods in receiving the equalized signal.

3. The receiver as claimed in claim 2, wherein the equalized signal has a first average frequency during the first period and a second average frequency during the second period, and the second average frequency is higher than the first average frequency.

4. The receiver as claimed in claim 1, wherein the adjusting unit increases the compensation strength for the adaptive equalizer when the first strength signal is greater than the second strength signal for more than a third threshold, and decreases the compensation strength for the adaptive equalizer when the first strength signal is smaller than the second strength signal for more than a fourth threshold.

5. The receiver as claimed in claim 1, wherein the power detecting unit comprises:
    an envelope detector, for detecting the equalized signal to generate an envelope signal;

a first switch, coupled to the envelope detector for receiving the envelope signal, wherein the first switch is controlled by a first control signal and closed during the first period;

a second switch, coupled to the envelope detector for receiving the envelope signal, wherein the second switch is controlled by a second control signal and closed during the second period;

a first strength signal generator, coupled between the first switch and the adjusting unit, for calculating the first strength signal according to the envelope signal; and a second strength signal generator, coupled between the second switch and the adjusting unit, for calculating the second strength signal according the envelope signal.

6. The receiver as claimed in claim 5, further comprising:
a transition detector, for receiving one of the input signal and the equalized signal, and detecting a transition density of the one of the signal and the equalized signal; and
a control signal generator, for generating the first control signal and the second control signal;
wherein, the control signal generator closes the first switch with the first control signal when the transition density detected is lower than a first threshold, and closes the second switch with the second control signal when the transition density is higher than a second threshold.

7. The receiver as claimed in claim 5, further comprising:
an analog-to-digital converter, coupled between the envelope detector and the first and second switches, for converting the envelope signal to a digital envelope signal;
wherein, the first strength signal generator calculates a first average of the digital envelope signal during the first period to generate the first strength signal, and the second strength signal generator calculates a second average of the digital envelope signal during the second period to generate the second strength signal.

8. The receiver as claimed in claim 5, wherein the first strength signal generator and the second strength signal generator are respectively a low-pass filter.

9. A method for adjusting a compensation strength for an adaptive equalizer of a receiver, comprising:
equalizing an input signal from one of HDMI and DVI with the adaptive equalizer to generate an equalized signal;
detecting the equalized signal during a first period to obtain a first strength signal, and detecting the equalized signal during a second period to obtain a second strength signal; and
adjusting the compensation strength for the adaptive equalizer according to the first strength signal and the second strength signal, wherein the compensation strength for the adaptive equalizer is tuned up when the first strength signal is greater than the second strength signal, and is tuned down when the first strength signal is smaller than the second strength signal;
wherein the equalized signal is image data during the first period and the equalized signal is interval data during the second period.

10. The method as claimed in claim 9, wherein the first period and the second period are separated periods in receiving the equalized signal.

11. The method as claimed in claim 10, wherein the equalized signal has a first average frequency during the first period and a second average frequency during the second period, and the second average frequency is higher than the first average frequency.

12. The method as claimed in claim 9, wherein the step of detecting the strength of the equalized signal to obtain the first and second strength signals comprises:
detecting the equalized signal to generate an envelope signal; closing a first switch with a first control signal during the first period;
closing a second switch with a second control signal during the second period;
calculating the first strength signal according to the envelope signal; and
calculating the second strength signal according to the envelope signal.

13. The method as claimed in claim 12, further comprising:
receiving one of the input signal and the equalized signal; detecting a transition density of the one of the input signal and the equalized signal; and generating the first control signal and the second control signal; wherein, the first switch is closed by the first control signal when the transition density detected is lower than a first threshold, and the second switch is closed by the second control signal when the transition density detected is higher than a second threshold.

14. The method as claimed in claim 12, further comprising:
converting the envelope signal to a digital envelope signal;
wherein, the step of detecting the equalized signal to obtain the first and second strength signals further comprises:
calculating a first average of the digital envelope signal during the first period to generate the first strength signal; and
calculating a second average of the digital envelope signal during the second period to generate the second strength signal.

* * * * *